(12) United States Patent
Palmisano et al.

(10) Patent No.: US 10,570,056 B2
(45) Date of Patent: Feb. 25, 2020

(54) SUPERHYDROPHILIC AND ANTIFOGGING NON-POROUS TIO$_2$ FILMS FOR GLASS AND METHODS OF PROVIDING THE SAME

(71) Applicant: Khalifa University of Science and Technology, Abu Dhabi (AE)

(72) Inventors: Giovanni Palmisano, Abu Dhabi (AE); Corrado Garlisi, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 148 days.

(21) Appl. No.: 15/690,543

(22) Filed: Aug. 30, 2017

(65) Prior Publication Data

US 2018/0065883 A1 Mar. 8, 2018

Related U.S. Application Data

(60) Provisional application No. 62/382,278, filed on Sep. 1, 2016.

(51) Int. Cl.
*B32B 15/04* (2006.01)
*B32B 17/06* (2006.01)
*C03C 17/245* (2006.01)
*G02B 1/18* (2015.01)

(52) U.S. Cl.
CPC ............ *C03C 17/2456* (2013.01); *G02B 1/18* (2015.01); *C03C 2217/212* (2013.01); *C03C 2217/71* (2013.01); *C03C 2217/75* (2013.01); *C03C 2218/15* (2013.01)

(58) Field of Classification Search
USPC ................ 428/426, 428, 432, 688, 701, 702
See application file for complete search history.

(56) References Cited

U.S. PATENT DOCUMENTS

| | | | | |
|---|---|---|---|---|
| 6,103,363 | A * | 8/2000 | Boire | ................... C03C 17/002 |
| | | | | 428/325 |
| 7,887,903 | B2 | 2/2011 | Uehara et al. | |
| 8,106,124 | B2 | 1/2012 | Ougitani | |
| 9,034,489 | B2 | 5/2015 | Jing et al. | |
| 9,110,229 | B2 | 8/2015 | Zhao et al. | |
| 2005/0221098 | A1* | 10/2005 | Azzopardi | ............. B01J 21/063 |
| | | | | 428/446 |
| 2007/0281419 | A1* | 12/2007 | Alhomoudi | ........... C23C 14/083 |
| | | | | 438/240 |
| 2009/0181256 | A1 | 7/2009 | Sharma | |
| 2010/0068486 | A1 | 3/2010 | Kayanoki | |
| 2012/0088106 | A1 | 4/2012 | Jing et al. | |

\* cited by examiner

*Primary Examiner* — Lauren R Colgan
(74) *Attorney, Agent, or Firm* — Myers Bigel, P.A.

(57) ABSTRACT

Superhydrophilic and antifogging non-porous TiO$_2$ films for glass substrates and methods of providing the TiO$_2$ films are provided. The TiO$_2$ films may maintain a water contact angle less than 5° in the dark for five days after an annealing treatment, and the water contact angle of the TiO$_2$ films may stabilize at less than 20° after ten days from the annealing treatment. The TiO$_2$ films may have a thickness of about 20 nm and may be transparent. The methods may include depositing a TiO$_2$ film on a glass substrate using e-beam evaporation. The methods may further include annealing the TiO$_2$ film after depositing the TiO$_2$ film on the glass substrate. The methods may not include UV radiation.

25 Claims, 14 Drawing Sheets

SUPERHYDROPHILIC AND ANTIFOGGING NON-POROUS TIO$_2$ FILMS FOR GLASS AND METHODS OF PROVIDING THE SAME

REFERENCE TO PRIORITY APPLICATION

This application is related to and claims the priority of U.S. Provisional Application Ser. No. 62/382,278, entitled METHOD FOR THE PRODUCTION OF SUPERHYDROPHILIC AND ANTIFOGGING PROPERTIES OF NON-UV ACTIVATED, NON-POROUS TIO2 FILMS ON GLASS, filed in the USPTO on Sep. 1, 2016, the entire disclosure of which is incorporated herein by reference.

BACKGROUND

Keeping glass clean from fogging up is one of growing interests among glass manufacturers and suppliers. Anti-fog glass is becoming more and more prevalent in day to day products such as bathroom mirrors, car windows, eye glasses, etc. Having anti-fog glass may increase safety in many instances such as in cars. When there is humidity or a rapid temperature change, fogging glass may disrupt the driver's ability to see through their windscreen or to see views in side view mirrors. In other applications, anti-fog glass may eliminate the inconvenience of fogging in kitchen and bathroom glass and mirrors caused by hot showers and boiling water. There are many other places and circumstances where anti-fog glass may help safety and convenience, such as on facade glass in the presence of a significant temperature gradient and high environmental humidity.

Because of the synergetic effect of photocatalysis and photo-induced hydrophilicity of titanium oxide (TiO$_2$), TiO$_2$ has been considered as a good candidate for a large-scale and relatively inexpensive applications in the fields of antifogging and self-cleaning coatings. It is known that TiO$_2$ hydrophilic surfaces can be obtained by UV activation through a redox mechanism that results in trapping of the photo-generated holes at lattice sites and subsequent Ti—O bond rupture by adsorbed water molecules, and forming new hydroxyl groups. The rapid advance in surface science and the increasing industrial demand has significantly facilitated the development of anti-fogging and self-cleaning engineered surfaces showing a superhydrophilic character without any external stimuli, in which titanic is combined with other materials such as in the case of multilayer assemblies constituted by TiO$_2$ nanoparticles and polyethylene glycol or yet porous ZnO/TiO$_2$ composite films.

Few studies deal with the fabrication of coatings made exclusively by TiO$_2$ and superhydrophilic without radiation. Existing methods include the preparation of porous TiO$_2$ nanostructures by a sol-gel method, exhibiting stable superwetting properties without the need of light activation. Other methods include fabricating perpendicular TiO$_2$ nanosheet films by a hydrothermal treatment of a titanium metal sheet with aqueous urea, resulting in superhydrophilicity without UV irradiation due to the enhanced density of oxygen defects or dangling bonds present in these structures.

Many attempts have been made to control the wettability by tuning coating porosity and roughness, which may allow water to rapidly permeate the three-dimensional porous network that induces the complete wetting of the surface. Porous films, containing a mixture of all the main three polymorphs of TiO$_2$, have previously been synthetized by supersonic aerosol deposition. These films became superhydrophilic without UV illumination after high-temperature annealing. Porous structures may not meet the requirements of high transparency in the visible region due to the high surface roughness dramatically depleting the transmittance of the coatings seriously affected by an enhanced diffuse scattering. In addition, their mechanical properties may be poorer than those of compact films and thus those may not be used as long-lasting building materials.

SUMMARY

According to some embodiments of the invention, a coated glass may include a glass substrate and a TiO$_2$ film on the glass substrate. The TiO$_2$ film may maintain a water contact angle less than 5° in the dark for five days after an annealing treatment.

In some embodiments, the water contact angle of the TiO$_2$ film may stabilize at less than 20° after ten days from the annealing treatment. In some embodiments, the water contact angle of the TiO$_2$ film may be less than 5° for eight days from the annealing treatment and UV-exposure and may stabilizes at less than 15° after fifteen days from the annealing treatment and UV-exposure. In some embodiments, the TiO$_2$ film may have a thickness of about 20 nm. The coated glass may have optical transmittance greater than 85% at wavelength higher than 350 nm, and optical transmittance of the coated glass may be similar to optical transmittance of the glass substrate (i.e., a bare glass) at wavelength higher than 350 nm.

In some embodiments, the coated glass may show high water spreading after exposure to humid indoor air following 2 hours in the deep-freeze at −15° C., thereby reducing or possibly preventing glass fogging and ensuring its transparency in the visible range. According to some embodiments of the invention, a coated glass may include a glass substrate and a TiO$_2$ film on the glass substrate. The TiO$_2$ film may have a grain size of from about 30 nm to about 50 nm.

According to some embodiments of the invention, a method of providing a coated glass may include depositing a TiO$_2$ film on a glass substrate using e-beam evaporation. In some embodiments, the method may further include annealing the TiO$_2$ film after depositing the TiO$_2$ film on the glass substrate.

In some embodiments, annealing the TiO$_2$ film may be carried out in air. In some embodiments, depositing the TiO$_2$ film may include rotating the glass substrate and may be carried out after a base pressure reaches at about $3.0 \times 10^{-6}$ Torr. Depositing the TiO$_2$ film may be carried out while maintaining a constant evaporation rate of about 1 Å s$^{-1}$. In some embodiments, depositing the TiO$_2$ film may be carried out at an accelerating voltage of about 10 kV with a filament current of about 26.5 A and emission current in a range of about 55 mA to about 65 mA.

BRIEF DESCRIPTION OF THE DRAWINGS

FIG. 4A shows variations of contact angle of an UV-unexposed $TiO_2$-GLASS, FIG. 4B shows variations of contract angle of a preliminarily UV-exposed $TiO_2$-GLASS, and FIG, 4C shows variations of contact angle of a commercial product.

FIG. 5A and FIG. 5B are micrographs of the commercial product before and after the vapor pressure increase from 600 to 765 Pa, respectively. FIG. 5C and FIG. 5D are micrographs of $TiO_2$-GLASS before and after the vapor pressure increase, respectively.

FIG. 12A shows three samples that appeared transparent before the anti-fogging test. FIG. 12B shows anti-fogging characters of bare glass, 20-$TiO_2$-GLASS after two months from the thermal treatment and the commercial product. FIG. 12C depicts a comparison graph showing UV-vis transmittance data of the commercial product and the glass before and after the application of a 20 nm-thick layer of $TiO_2$.

FIG. 14A shows the concentrations of methanol and formaldehyde monitored over the time, and FIG. 14B shows the concentrations of 2-propanol and acetone monitored over the time.

Figure 1:
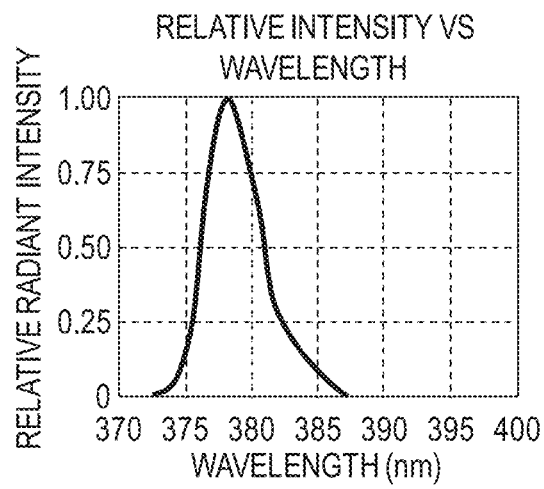
FIG. 1 illustrates emission of a lamp during degradation tests.
Figure 1:
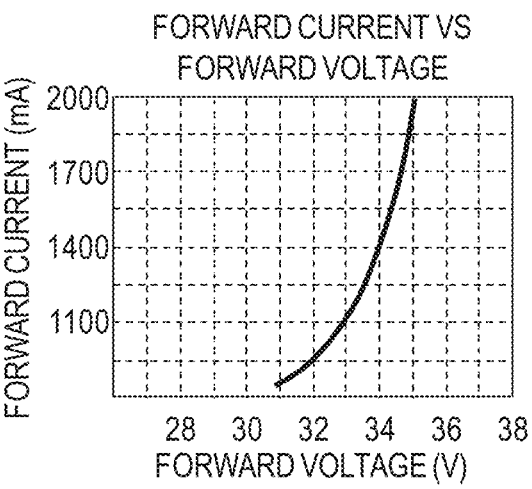
Figure 1:
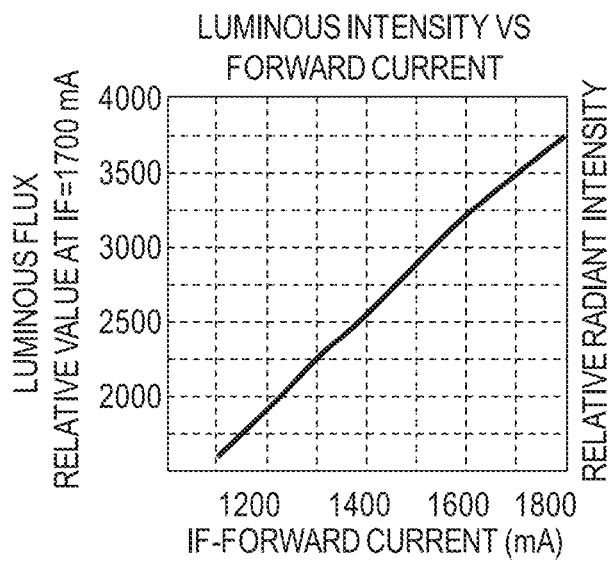
Figure 1:
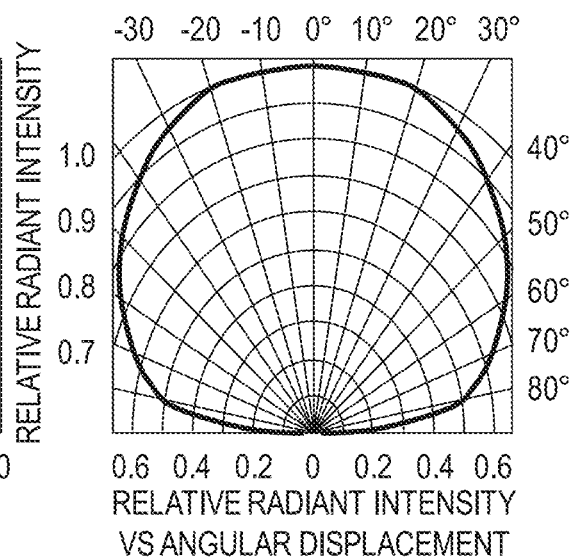

DETAILED DESCRIPTION $TiO_2$ films according to some embodiments of the present invention may be non-porous films such that their surfaces are microscopically flat and smooth down to the molecular level and may not allow water to pass through those.

As used herein, the expression "in the dark" refers to a milieu in the absence of UV light with a weak visible radiation coming from the surrounding indoor environment, which is measured and found to be about 0.3 W m$^{-2}$ in the range 450-950 nm.

As used herein, "root mean square (RMS) roughness" refers to the root mean square average measured height deviation taken or measured within an evaluation length or area. "root mean square (RMS) roughness" is also discussed in, for example, U.S. Patent Application Publications No. US20120256201, US 20140049822, and US20160204343.

As used herein, "water contact angle" refers to the angle of contact between a drop of water and the surface of interest as a measure of the tendency for the water to spread over or wet the solid surface. The lower the contact angle, the greater the tendency for the water to wet the solid, until complete wetting occurs at an angle of zero degrees. "Water contact angle" is also discussed in, for example, U.S. Patent Application Publications No. US20100304338, US20120026457, and US20130118127.

As used herein, the term "about" refers to a value that is 20%, 15%, 10%, 9%, 8%, 7%, 6%, 5%, 4%, 3%, 2%, 1%, 0.5%, 0.1%, 0.05%, or 0.01% of the stated value, as well as values intervening such stated values. For example, the phrase "about 200" includes ±20% of 200, from 160 to 240.

Throughout the specification, glass functionalized by the e-beam deposited $TiO_2$ film according to some embodiments of the present invention is referred to as "$TiO_2$-GLASS". Unless otherwise specified, the thickness of the $TiO_2$ film is 250 nm. The glass functionalized by a 20 rim-thick $TiO_2$ film according to some embodiments of the present invention is referred to as "20-$TiO_2$-GLASS".

As appreciated by the inventors, one of the possible routes to enhance the wettability of $TiO_2$-based coatings is high-temperature annealing treatment. Annealing may modify the crystal structure of $TiO_2$films and their surface chemistry and thus may improve hydrophilic properties of these films. Specifically, annealing may improve hydrophilic properties by producing oxygen vacancies, increasing roughness and eliminating organic impurities. Therefore, according to some embodiments of the present invention, superhydrophilic $TiO_2$ films may be provided using radiation-free methods which do not use radiation (e.g., UV radiation).

According to some embodiments of the present invention, Ti), thin films may be deposited by e-beam evaporation, and this technique may provide an atom efficient, cost effective way of fabricating innovative nanostructures in large-scale industrial plants, as compared with other methods, such as sol-gel processes. The functionalization of glass with such thin $TiO_2$ films may be able to produce optically transparent, self-cleaning and antifogging glass. The implications of this breakthrough may go behind this application, being beneficial in any situation where flat condensation of water is desirable, as for instance in environmental humidity capture.

According to some embodiments of the present invention, methods of providing a $TiO_2$ coating (e.g., film) using e-beam evaporation are provided, and the methods may be used to provide self-cleaning superhydrophilic glass. A $TiO_2$ coating deposited using e-beam evaporation may be annealed at 500° C., and the annealed $TiO_2$ coating may be a non-porous film that exhibits radiation-free superwetting behavior ascribed to the high number of oxygen vacancies therein along with its crystallinity. The superhydrophilic and antifogging properties of the $TiO_2$ coating, which can be reactivated by a thermal treatment or prolonged through UV exposure, may provide potential applications to both outdoor and indoor applications. The $TiO_2$ coating having a thickness of about 20 nm may not alter the optical and mechanical properties of glass on which the $TiO_2$ coating is deposited. In addition, adhesion of the $TiO_2$ coating to a substrate (e.g., glass substrate) may be very effective. A 20 nm $TiO_2$ film provided by the methods according to some embodiments of the present invention may possess a better photocatalytic activity than a commercial self-cleaning glass. The method of providing $TiO_2$ coatings that have improved properties may become a breakthrough in designing multifunctional coatings for next generation self-cleaning transparent coatings, along with more applications involving the use of a flat superhydrophilic and self-cleaning surface.

According to some embodiments of the present invention, methods of increasing the wettability of glass or similar surfaces are provided. The methods may include depositing a thin, non-porous film of $TiO_2$ using e-beam evaporation with $TiO_2$ source on a clean glass surface under a vacuum. In some embodiments, a base vacuum in a chamber, before the deposition process, may be about $3.0 \times 10^{-6}$ Torr and may be maintained constant during the deposition process. In some embodiments, the glass may be rotated at 40 rpm during the deposition process. An evaporation rate may be, for example, about 1 Å s$^{-1}$. In some embodiments, the evaporation rate may be maintained constant at about 1 Å s$^{-1}$. In some embodiments, the accelerating voltage may be about 10 kV, and the filament current may be about 26.5 A. In some embodiments, the emission current may be in a range of about 55 mA to about 65 mA throughout the deposition process. In some embodiments, a thickness of the $TiO_2$ film may range from about 20 nm to about 250 nm.

In some embodiments, a $TiO_2$ film deposited using e-beam evaporation may be annealed in air at a temperature of about 500° C. for about 4 hours. In some embodiments, a $TiO_2$ film deposited using e-beam evaporation may be annealed by the following steps: heating up to 475° C. (a ramp rate of about 10° C./min) and annealing for 5 min at 475° C.; heating up to 500° C. (a ramp rate of 2.5° C./min) and annealing for 4 hours at 500° C.

In some embodiments, deposited and annealed $TiO_2$ films may have compact nonporous structures. In some embodiments, deposited and annealed $TiO_2$ films may have superwetting properties in the absence of UV activation. In some embodiments, deposited and annealed $TiO_2$ films may demonstrate superior performance compared to a bare glass substrate and a commercial self-cleaning glass in its antifogging and optical properties. Superhydrophilic characteristics may arise from the deposition technique inducing a large amount of oxygen vacancies and may be further boosted by an annealing treatment. In some embodiments, the superhydrophilic character may be maintained even when a $TiO_2$ film has a small thickness, for example, ranging from about 20 to about 50 nm. Adhesion of the $TiO_2$ film to the glass substrate was confirmed by ultrasound stress test and cross-cut test performed according to ISO 2409 standard.

Photocatalytic activity of the $TiO_2$ film was assessed by degradation of methanol and 2-propanol under UV light in a gas phase reactor, and the $TiO_2$ film showed superior performance to a commercial product.

In the Examples discussed below, a commercial product refers to Pilkington Activ™, which is self-cleaning and photocatalytic glass.

EXAMPLE 1

Preparation of E-Beam Deposited $TiO_2$ films.

For film preparation, $TiO_2$ films were deposited on bare glass substrates, 25×75 mm soda-lime glass substrates (provided by Sigma-Aldrich), by e-beam evaporation. Before the deposition, the substrates were ultrasound cleaned with acetone and isopropanol in two successive 10-minute steps. :Pellets (size: 1-3 mm) made of $TiO_2$ (99.9% pure), which are provided by Plasmaterials, were used as source materials in the Temescal BJD-2000 e-beam evaporation system. Typical base vacuum in the chamber before the deposition was $3.0 \times 10^{-6}$ Torr. The substrates were rotated at 40 rpm during the deposition and the evaporation rate was kept constant at 1 Å s$^{-1}$. The accelerating voltage was 10 kV, and the filament current was 26.5 A. The emission current was in a range of 55 mA to 65 mA throughout the deposition process. Films having different thicknesses of from 20 nm to 250 nm were prepared. Stylus profilometer (Veeco Dektak 150) was used to confirm the film thicknesses. After the deposition, the films were annealed in air through the following steps: heating up to 475° C. (ramp rate of 10° C./min) and annealing for 5 min at 475° C.; and heating up to 500° C. (ramp rate of 2.5° C./min) and annealing for 4 hours at 500° C.

EXAMPLE 2

Methods for Analysis of Structural and Morphological Properties of Non-Porous $TiO_2$ Films Scanning electron microscopy (SEM, FEI Nova NanoSEM) was used to analyze microstructure of the deposited $TiO_2$ films, after sputtering a 5 nm layer of Au Pd to the films. Atomic force microscopy (AFM) measurements were performed using a Cypher AFM from Asylum Research (scan rate: 0.8 Hz, integral gain: 10) to analyze topography of the films and their roughness.

The crystal phase of the films were analyzed by XRD measurements performed with a Panalytical Empyrean system, using CuKα as radiation source (1.5418 Å) at power settings of 45 kV and 40 mA. Diffraction patterns were recorded in the range of diffraction angles 2θ from 20° to 60° with a grazing angle of 3° and a scan rate of 0.075°/min.

Adhesion of the film to the glass substrate was investigated by checking the release of particles into water during ultrasound treatment. 20-$TiO_2$-GLASS was cleaned in acetone and in ethanol in two successive 5-minute steps. After these cleaning, and 20-$TiO_2$-GLASS was dried under Argon flow. 20-$TiO_2$-GLASS was dipped in a beaker containing DI water with a clock glass on top. The beaker was placed into an ultrasound bath (Falc, 100 W, 50 kHz) for 7.5 hours. A bare glass slide was placed in another beaker and used as a control experiment. Before the test, the beakers were left overnight with a 4M HCl solution inside and rinsed with DI water many times in order to avoid the presence of any contamination during the experiment. Water samples were withdrawn at 2.5 and 5 hours and analyzed by a Z-sizer (ZetaPALS, Brookhaven) to verify the possible presence of suspended particles. Afterwards the used water was replaced by fresh DI water after rinsing the 20-$TiO_2$-GLASS, bare glass and beakers. The ultrasound treatment was extended by other 2.5 hours.

Adhesion of the film to the glass substrate was further tested by using an adhesive transparent tape. After detaching the tape from the 20-$TiO_2$-GLASS, the tape surface was analyzed by Raman Spectroscopy (Witec Alpha 300R equipment) to search for $TiO_2$ characteristic signals.

Adhesion tests were also carried out by adhesion (TQC model CC3000) tests according to the ISO 2409 standard. The incurrence of any scratches following the tests was evaluated by an optical microscope (Olympus BX51M).

Dynamical Mechanical Analysis (DMA) was performed using a DMA 800 analyzer from PerkinElmer. The 20-$TiO_2$-GLASS film was heated from room temperature to 250° C. at a heating rate of 3° C./min and frequency of 1 Hz. The results were compared to those of the bare glass annealed at 500° C.

The hydrophilic properties of the films were evaluated by a Kruss Easy Drop Contact Angle analysis machine. After annealing, $TiO_2$-GLASS was cleaned in acetone and then in ethanol in two successive 5-minute steps and finally dried under Argon flow. Eventually, samples were heated at 50° C. for 30 min in order to allow for the volatile organic residues to be removed. Glass substrate and a commercial product underwent the same treatment prior to measure the contact angle. On each sample, five consecutive measurements were performed to report a reliable average contact angle. The drop volume was 5 µL. In some cases, 30 min UV-vis irradiation was provided by a 500 W Mercury-Xenon lamp connected to an optical fiber, before measuring the contact angles. The average values of radiation intensity reaching the surface of bare and functionalized glass samples, measured with a Delta Ohm 9721 radiometer and the matching probes, were 33.4 W m$^{-2}$ in the range 200-280 nm, 75 W m$^{-2}$ in the range 280-315 nm, 54 W m$^{-2}$ in the range 315-400 nm, and 131 W m$^{-2}$ in the range 450-950 nm. Hydrophilic properties of the functionalized glass were also assessed after being exposed to outdoor environment in Abu Dhabi for one month (Aug. 18, 2016-Sep. 17, 2016).

The investigation of wettability properties at the microscale was performed by using an Environmental SEM (FEI, Quanta 250). The sample was cooled down to 1° C. while keeping the chamber pressure at 100 Pa, After 1 hour, the pressure was raised slowly to 600 Pa, waiting for the system to be in equilibrium. Water condensation was reached by further increasing the pressure up to 750 Pa. The sample stage was tilted of 5-10° in order to increase the droplets counts. The contact angle of droplets was then measured by using the software, Image J.

Raman spectroscopy was run by a Witec Alpha 300R equipment, with an excitation wavelength of 532 nm and a laser power of ca. 75 mW. Scans were taken over an extended range (100-800 cm$^{-1}$).

Antifogging properties were evaluated after placing the samples in a freezer at −15° C. for 2 hours, followed by exposure to indoor environmental atmosphere. Digital images were taken to qualitatively compare air humidity condensation on bare glass, 20-TiO$_2$-GLASS and a commercial product. Optical transmittance of the samples was measured by a UV-Vis spectrophotometer (Shimadzu UV-2600) in the 200-800 nm range.

Referring to FIG. 1, it illustrates the emission of the lamp used during the degradation tests on methanol and 2-propanol: a 50 W LED source was used with a UV emission centered at 385 nm. The average values of the radiation reaching the sample surface were 30.4 and 24.4 W m$^{-2}$ in the 315-400 and 450-950 nm ranges, respectively. The reactivity runs were performed in a 341 mL gas-phase reactor made of Pyrex glass and an external jacket in which water circulated continuously during the reaction to keep the temperature constant at ca. 22° C. Before injecting 0.5 µL of liquid methanol (ca. 11.5 µmol) and 2-propanol (ca. 6.2 µmol) in two different tests, the reactor was saturated with oxygen by continuously flowing for 30 min. After injection of the target molecules and before turning the lamp on, 10 min has elapsed to reach the adsorption/desorption thermodynamic equilibrium. During irradiation, the photoxidation of methanol and 2-propanol and the formation of formaldehyde and acetone, respectively, were assessed by a gas chromatograph (Shimadzu GC 2014). The gas chromatograph was equipped with a flame ionization detector and a Phenomenex column Zebron ZB-WAXplus 30 m L×0.32 mm ID. N$_2$ was used as the carrier gas and the carrier flow in the column was set at 1.60 mL min$^{-1}$. The column temperature was 65° C., whereas the injector and detector temperatures were 250° C. and 245° C. Photocatalytic activity of the outdoor exposed sample was also assessed.

EXAMPLE 3

Analysis of Hydrophilic and Wettability Properties of Non-Porous TiO$_2$ Films

Figure 2A:
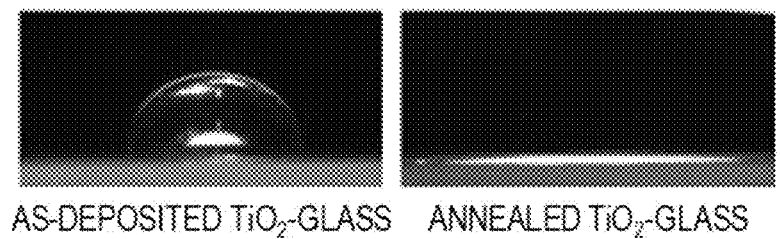
FIG. 2A shows images showing contact angles of an as-deposited TiO$_2$ film on a glass and an annealed TiO$_2$-GLASS.
Figure 2B:
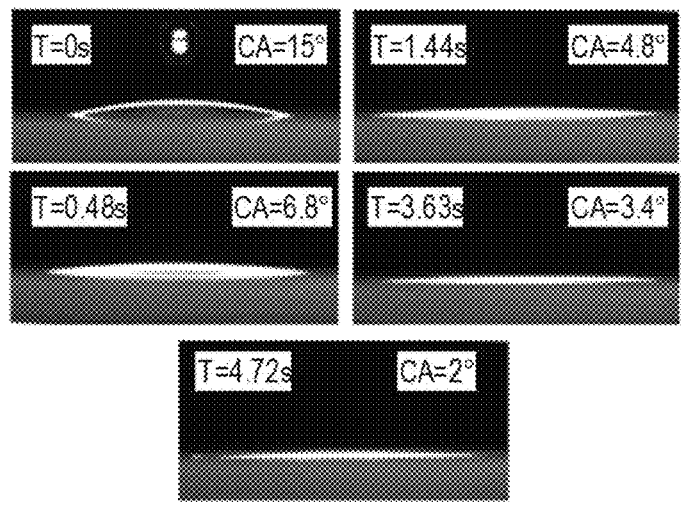
FIGS. 2B and 2C show images and a graph showing time evolution of contact angels of the annealed TiO$_2$ film in the absence of applied radiation.
Figure 2C:
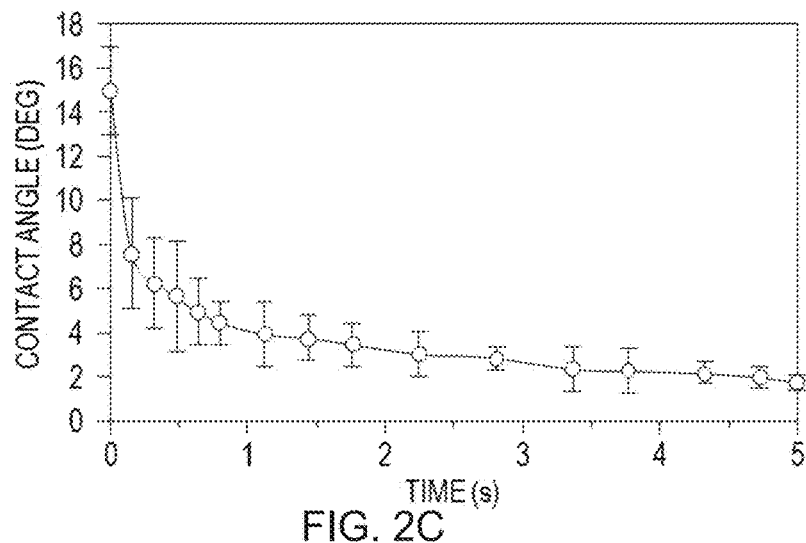
Figure 2D:
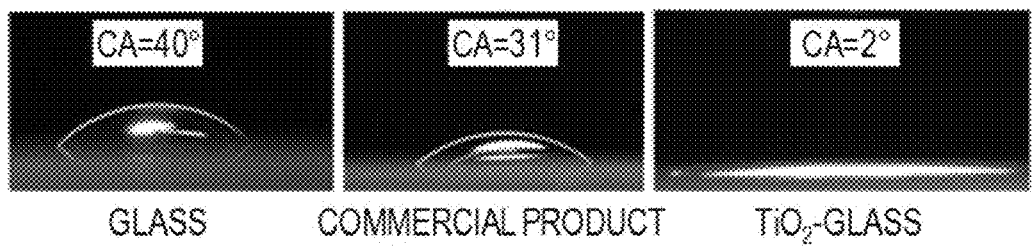
FIG. 2D shows images providing comparison between a bare glass, commercial product and annealed TiO$_2$-GLASS.

FIG. 2A shows images showing contact angles of an as-deposited TiO$_2$ film on a glass and an annealed TiO$_2$-GLASS. FIGS. 2B and 2C show images and a graph showing time evolution of contact angels of the annealed TiO$_2$ film in the absence of applied radiation. FIG. 2D shows images providing comparison between a bare glass, commercial product and annealed TiO$_2$-GLASS.

TiO$_2$-GLASS was found to be hydrophobic after deposition, with a water contact angle (CA) of 90±7°, whereas, after annealing at 500° C., it appeared to be superhydrophilic with CA close to 0° with water spreading completely and evenly upon the surface as shown in FIG. 2A. This large variation in surface energy after the thermal treatment results from the generation of a large number of oxygen vacancies following the release of surface oxygen occurring upon the annealing/crystallization, making the surface more prone to adsorb water in a flat shape.

Figure 3:
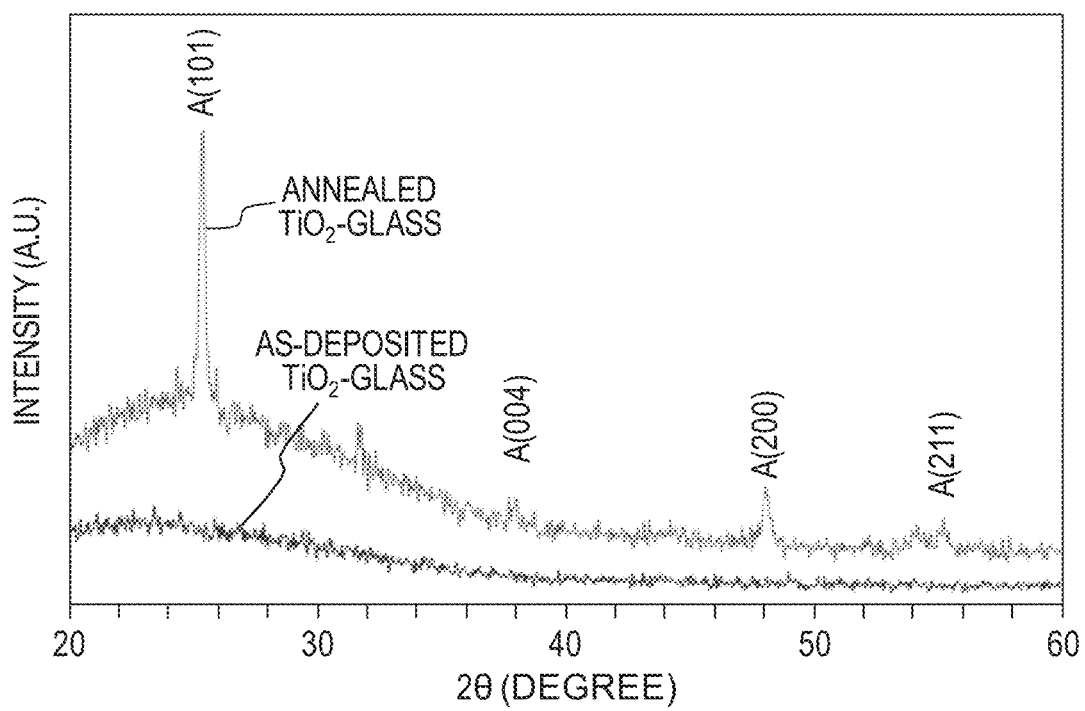
FIG. 3 shows XRD patterns of annealed TiO$_2$-GLASS and as-deposited TiO$_2$-GLASS.

FIG. 3 shows XRD patterns of annealed TiO$_2$-GLASS and as-deposited TiO$_2$-GLASS. The thermal induced superhydrophilicity is fostered by changes in structural properties as confirmed by the XRD pattern in FIG. 3. After annealing, the films become crystalline and show the presence of well-crystallized anatase phase.

The time evolution of the contact angle (CA) relative to the thermal treated TiO$_2$-GLASS is shown in FIGS. 2B and 2C. It is critical to emphasize that no UV light was used during the experiment, and the weak visible light of the surrounding environment was measured and found to be 0.3 W m$^{-2}$ in the range 450-950 nm. All the measurements were performed using a water droplet of quite large volume (5 µL) in order to monitor the spread pattern and uniformity over the film. Annealed TiO$_2$-GLASS was found to reach a superhydrophilic state (CA<5°) very fast with the water droplet spreading completely and uniformly on the sample surface within five seconds. When compared with bare glass and the commercial product, one of the most used photocatalytic glasses currently on the market, TiO$_2$-GLASS exhibited a marked improvement in the wettability properties, as shown in FIG. 2D. The CAs for bare glass and commercial product were found to be 40±10° and 31±5°, respectively.

The performance of the prepared materials was investigated by varying the film thickness between 20 and 250 nm. In porous materials, a decrease in the thickness usually causes a dramatic drop in hydrophilicity owing to the poorer density of networked nanostructures that are responsible for a quick water adsorption. Conversely, in our nonporous coatings, the hydrophilicity is a surface phenomenon occurring without the support of a three-dimensional network. As a result, wettability properties are relatively independent of the thickness, and notably, samples continued to be superhydrophilic even at the small thickness of 20 nm, which makes these materials extremely suitable for self-cleaning coatings requiring high optical transparency.

Figure 4A:
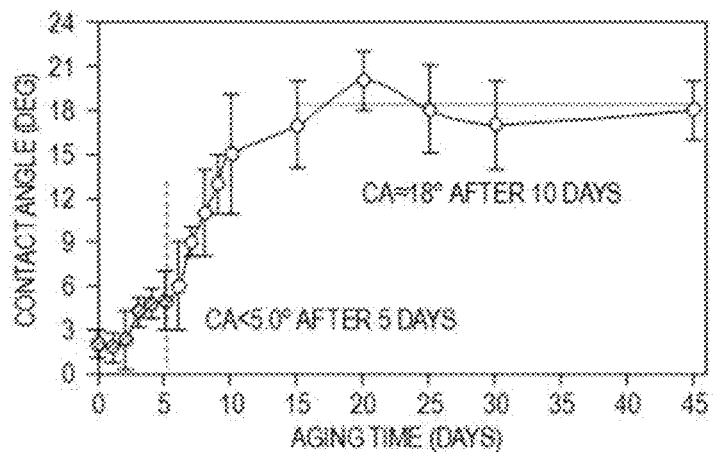
FIGS. 4A, 4B, and 4C show variations of contact angle of tested glasses over time.
Figure 4B:
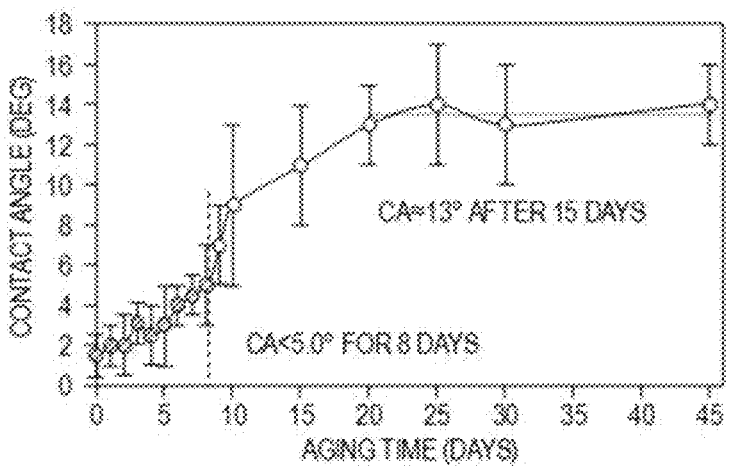
Figure 4C:
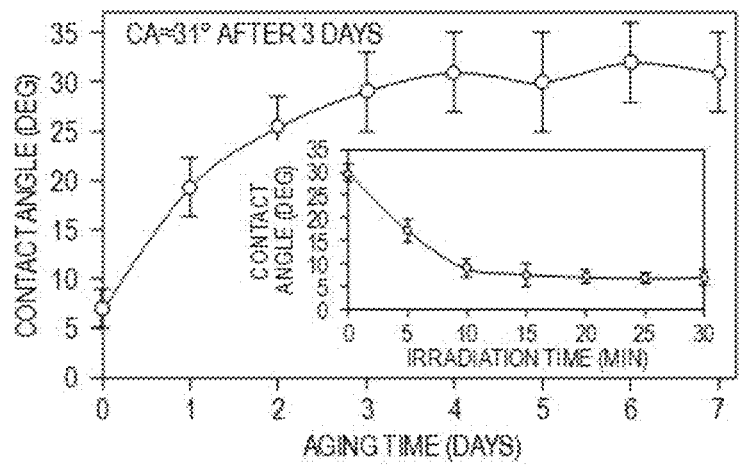

FIGS. 4A, 4B, and 4C show variations of contact angle of tested glasses over time. FIG. 4A shows variations of contact angle of an UV-unexposed TiO$_2$-GLASS, FIG. 4B shows variations of contact angle of a preliminarily UV-exposed TiO$_2$-GLASS that is TiO$_2$-GLASS which has been preliminarily exposed to UV, and FIG. 4C shows variations of contact angle of a commercial product, which has been preliminarily exposed to UV, with the corresponding inset showing the decrease in contact angle under continuous UV radiation. Day 0 in FIGS. 4A and 4B refers to the day of the annealing treatment for the UV-unexposed $TiO_2$-GLASS and the $TiO_2$-GLASS, and Day 0 in FIG. 4C refers to the day of UV treatment for the commercial product.

Both the preliminarily UV-exposed and UV-unexposed films were kept in the dark between consecutive measurements (with intervals of 1, 5 or 15 days).

Investigations were undertaken in order to study the superhydrophilic stability through wetting-dewetting cycles. Superhydrophilic state was maintained for up to five days after the annealing treatment, reaching a plateau at 18±5° after ten days, as shown in FIG. 4A. $TiO_2$-GLASS returned to their original wetting behavior after re-annealing with CAs close to 0°. High-temperature annealing normally results in the removal of organic contaminants that can be responsible for hydrophobicity and whose effects are unavoidable following environmental exposure.

In order to study the effect of UV radiation on the films, specifically, to assess any possible extension of the superhydrophilic stability over time, contact angles were monitored for up to 45 days after 30 minutes irradiation of virgin $TiO_2$-GLASS, and the results were compared to those of the same $TiO_2$-GLASS, which did not undergo any preliminary irradiation.

After UV exposure, the CA of the preliminarily UV-exposed $TiO_2$-GLASS remained below 5° for eight days, stabilizing at 13+5° after fifteen days as shown in FIG. 4B. The commercial product reverted back to its original value of 31±5° in three days after being UV-exposed for the same time as shown in FIG. 4C, reaching a minimum value of 7±2° under continuous UV light soaking as shown in the inset of FIG. 4C.

After aging for 6 months, $TiO_2$-GLASS and 20-$TiO_2$-GLASS samples were reannealed and exposed to the extreme weather of Abu Dhabi between August and September, when temperatures are normally in the range 30-45° C. and the atmospheric dust loading is extremely high. The contact angle was 22±3° after one month exposure, thereby only increasing by 4.0° compared with the value obtained in indoor environment. Remarkably, even after outdoor exposure, $TiO_2$-GLASS continued to show lower contact angles in comparison with the bare glass (40°) and the commercial product (31°).

Figure 5A:
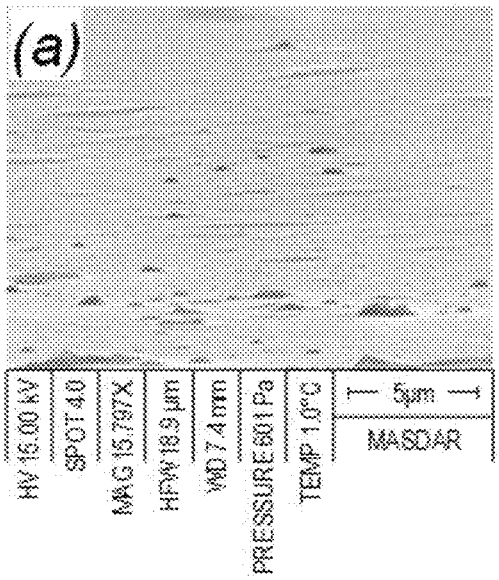
FIGS. 5A, 5B, 5C, and 5D show images of micro-scale wettability characterization by ESEM.
Figure 5B:
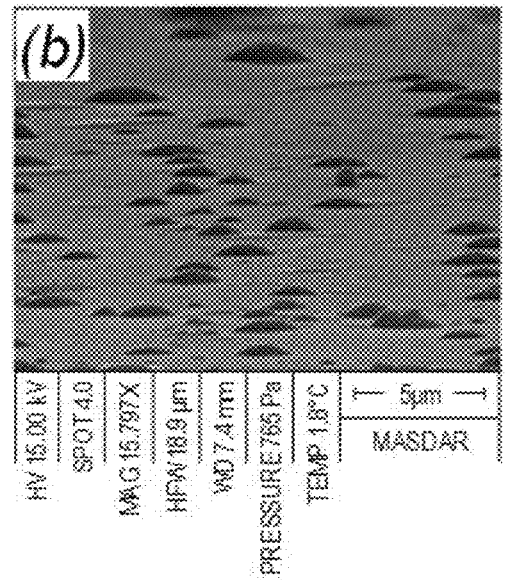
Figure 5C:
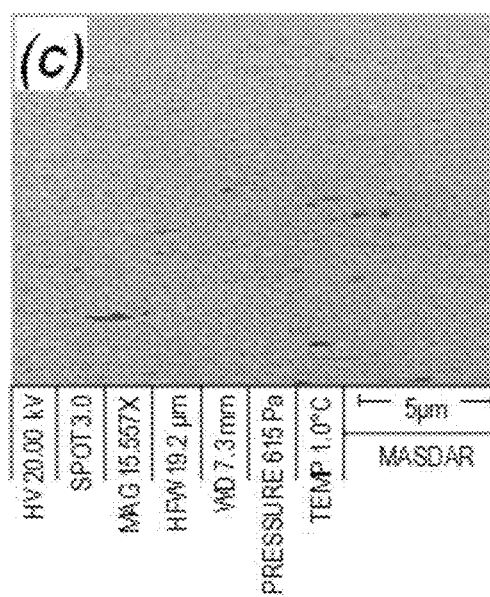
Figure 5D:
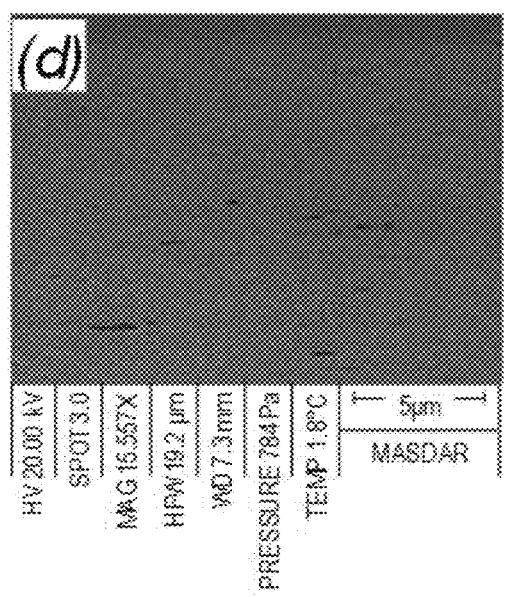

FIGS. 5A, 5B, 5C, and 5D show images of micro-scale wettability characterization by. ESEM. FIG. 5A and FIG. 5B are micrographs of the commercial product before and after the vapor pressure increase from 600 to 765 Pa, respectively. The increase in the vapor pressure resulted in water droplets condensed on the surface. FIG. 5C and FIG. 5D are micrographs of $TiO_2$-GLASS before and after the vapor pressure increase, respectively. No difference between FIG. 5C and FIG. 5D was observed.

The wetting behavior of the film surface was explored at the micro-scale by carefully tuning the vapor pressure inside an environmental SEM (ESEM) and analyzing the resulting water droplets condensed on the surface. FIG. 5A and FIG. 5B depict the typical micrographs obtained inside the ESEM chamber for the commercial product. The pressure was increased from 600 up to 765 Pa in order to have water condensation and to measure the resulting CA, which was found to be 38±10°, slightly higher with respect to the one obtained by traditional contact angle measurements. This difference could be due to a different ESEM-chamber pressure compared to environmental pressure and to the lower temperature. As shown in FIG. 5C and FIG. 5D, $TiO_2$-GLASS showed no evidence of droplet condensation after increasing the pressure. This is attributable to the extremely low CA, which hampered the formation of clearly visible droplets even at the micro-scale.

Figure 6A:
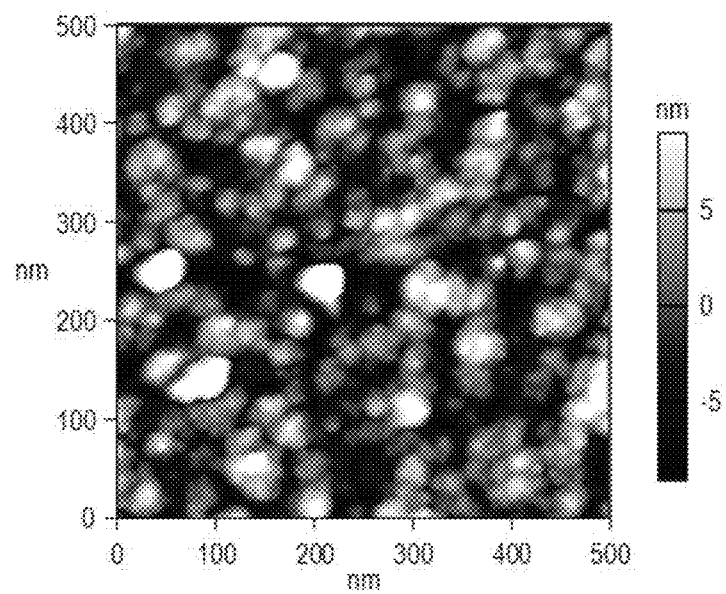
FIG. 6A shows an AFM image.
Figure 6B:
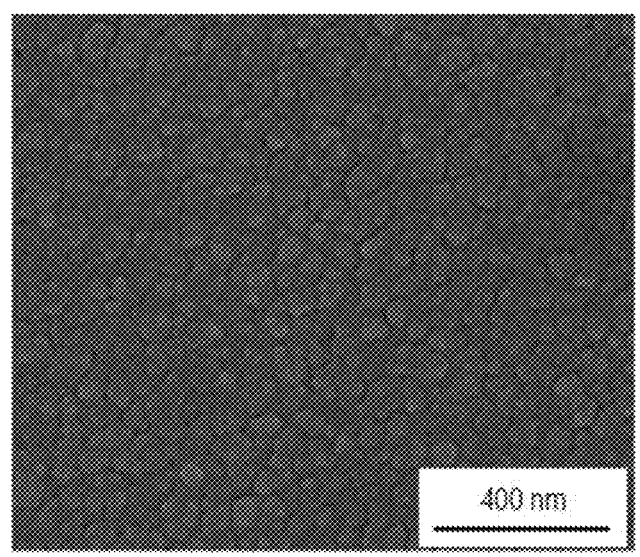
FIG. 6B shows SEM micrograph of $TiO_2$-GLASS.

FIG. 6A shows an AFM image, and FIG. 6B shows SEM micrograph of $TiO_2$-GLASS. As shown in FIGS. 6A and 6B, the AFM and SEM images of the annealed $TiO_2$-GLASS highlighted the dense and nonporous structure formed by grains with size of ca. 30-50 nm. No cracks were present, proving the excellent mechanical stability of the film and the high adhesion to the glass substrate. The root mean square (RMS) roughness was 13.6±1.5 nm, greater than the figure estimated in the as-deposited $TiO_2$-GLASS (3.7±1.1 nm).

Figure 7A:
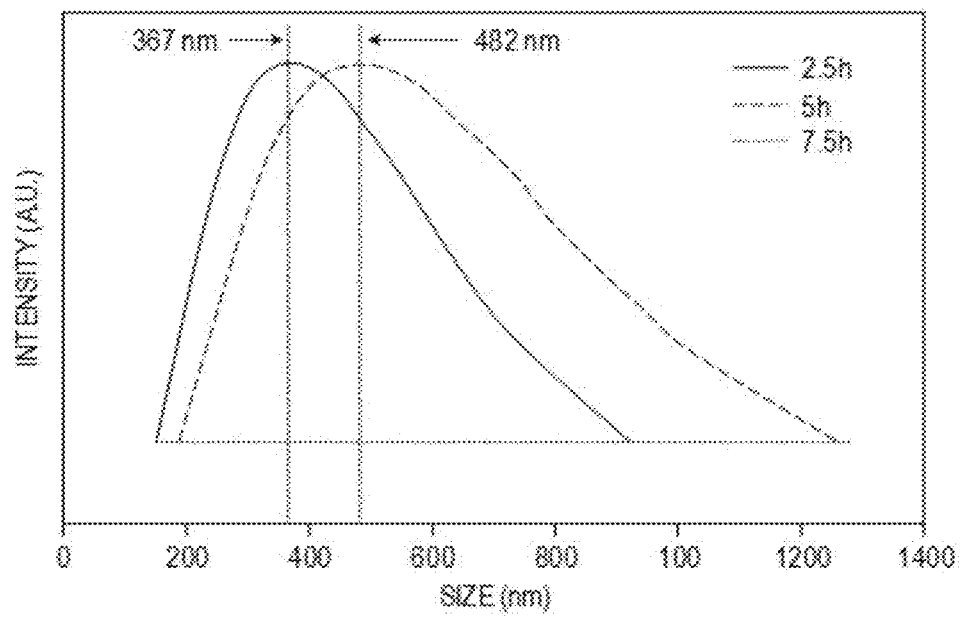
FIGS. 7A and 7B depict size distribution of particles in water samples withdrawn from the beaker containing the 20-$TiO_2$-GLASS (FIG. 7A) and from the beaker containing the bare glass (FIG. 7B) after ultrasound treatment.
Figure 7B:
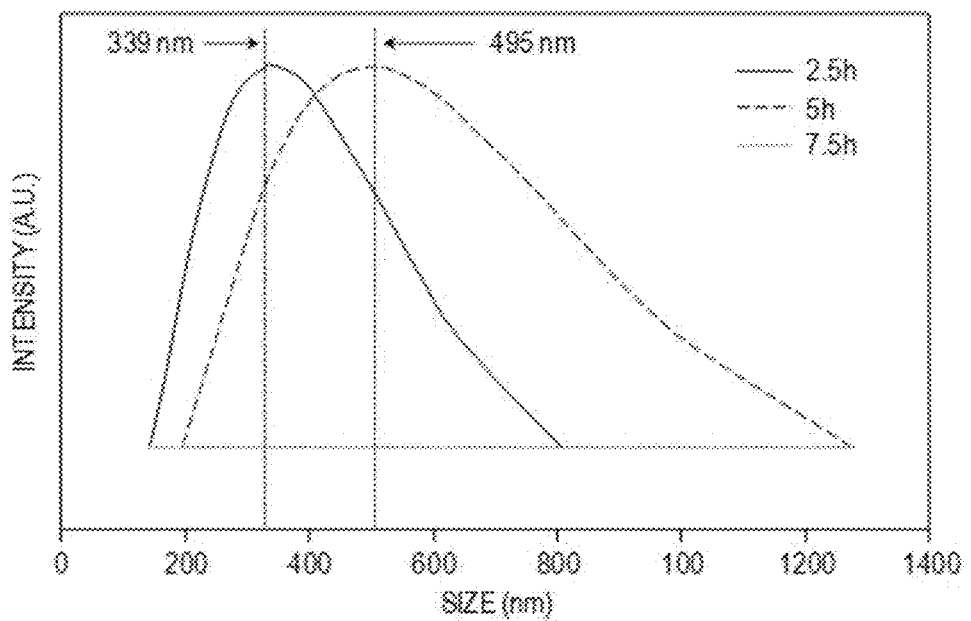

FIGS. 7A and 7B depict size distribution of particles in water samples withdrawn from the beaker containing the 20-$TiO_2$-GLASS (FIG. 7A) and from the beaker containing the bare glass (FIG. 7B) after ultrasound treatment. Water samples were withdrawn at 2.5 and 5 hours and analyzed by a Z-sizer (ZetaPALS, Brookhaven) to verify the possible presence of suspended particles. After 5 hours, the used DI water was replaced by fresh water after rinsing the glass samples and the beakers, and then the ultrasound treatment was extended by another 2.5 hours.

The adhesion of the 20 nm film to the glass substrate was investigated by checking the release of film particles into water during ultrasound treatment. The water samples were analyzed by a Z-sizer for a proper assessment. As shown in FIGS. 7A and 7B, size distribution of the particles leached out from the bare glass and the functionalized glass the 20-$TiO_2$-GLASS) into the water are very similar to each other. Accordingly, it appears that all suspended particles came from the glass, rather than from $TiO_2$ film, probably from sharp edges of the glass. Notably, after removing the used water including suspended particles, washing the bare glass and the 20-$TiO_2$-GLASS and dipping both in DI fresh water, the extended ultrasound treatment (up to 7.5 hour, see FIGS. 7A and 7B) did not result in any release of further particles.

Figure 8:
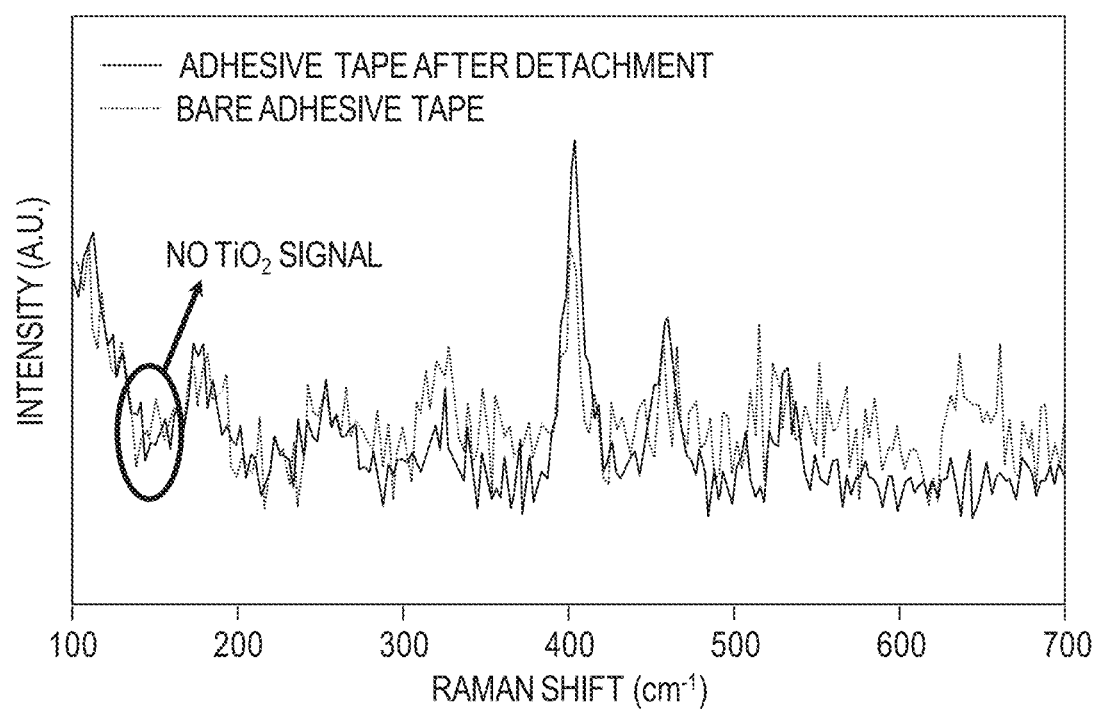
FIG. 8 shows Raman spectra of the adhesive tape before and after detachment from 20-$TiO_2$-GLASS.

FIG. 8 shows Raman spectra of the adhesive tape before ("BARE ADHESIVE TAPE") and after detachment ("ADHESIVE TAPE AFTER DETACHMENT") from 20-$TiO_2$-GLASS. The spectrum after detachment does not show any characteristic $TiO_2$ peak, and thus confirm the good adhesion of the film to the substrate.

An adhesive tape was attached to and detached from the 20 nm $TiO_2$ film of from 20-$TiO_2$-GLASS. The surface of the adhesive tape was analyzed by Raman spectroscopy, which is able to detect extremely thin layers of $TiO_2$. Referring to FIG. 8, the Raman spectrum of the tape after detachment is similar to the one of the bare tape. The main peak of anatase (145-150 $cm^{-1}$) is totally missing, and the result points to the strong attachment of the film to the glass substrate.

Figure 9A:
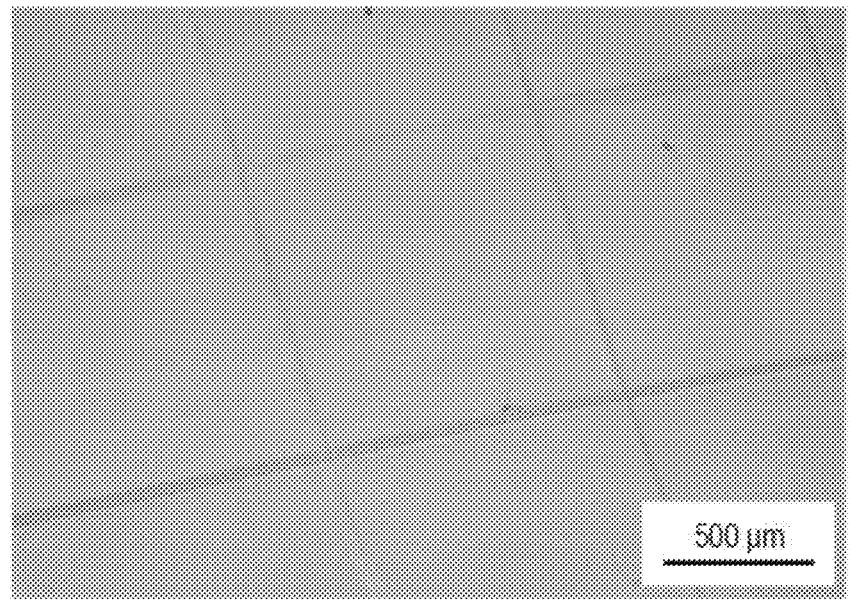
FIGS. 9A and 9B show optical image of 20-$TiO_2$-GLASS (FIG. 9A) and the commercial product (FIG. 9B) after the cross--cut test according to ISO 2409 standard.
Figure 9B:
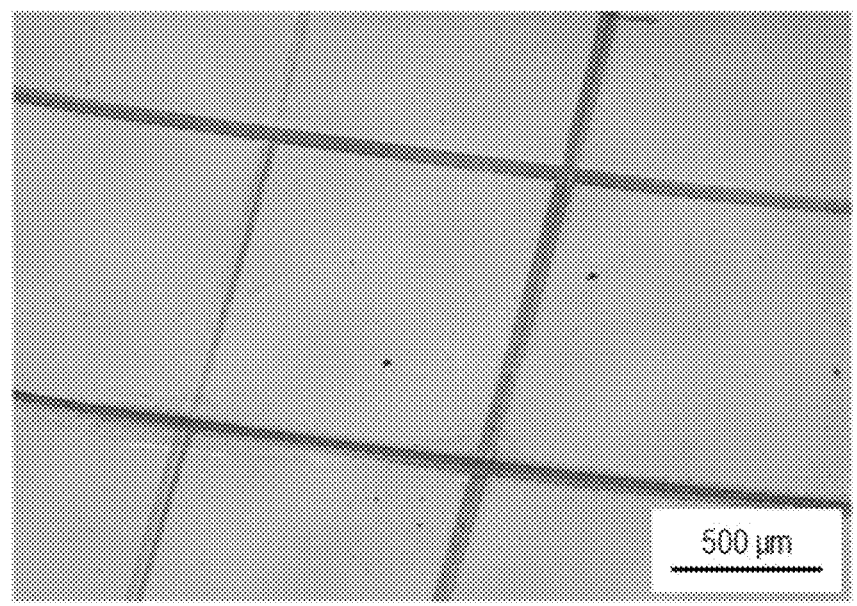

The adhesion of the 20 nm film to the glass substrate was also analyzed according to the ISO 2409. FIGS. 9A and 9B show optical images of 20-$TiO_2$-GLASS (FIG. 9A) and the commercial product (FIG. 9B) after the cross-cut test according to ISO 2409 standard. Specifically, FIGS. 9A and 9B show the optical images of the samples after the cross-cut test during which the coatings were crisscrossed with a cutter to form a lattice pattern. Subsequently, an adhesive tape was applied and detached at a 60° angle. 20-$TiO_2$-GLASS and the commercial product performed equally, and showed excellent adhesion without any noticeable detachment of the thin film from the glass substrate. According to ISO 2409 standard, the quality of both coatings can be ranked as "0" since the edges of the cuts were completely smooth and none of the squares of the lattice was detached.

Figure 10:
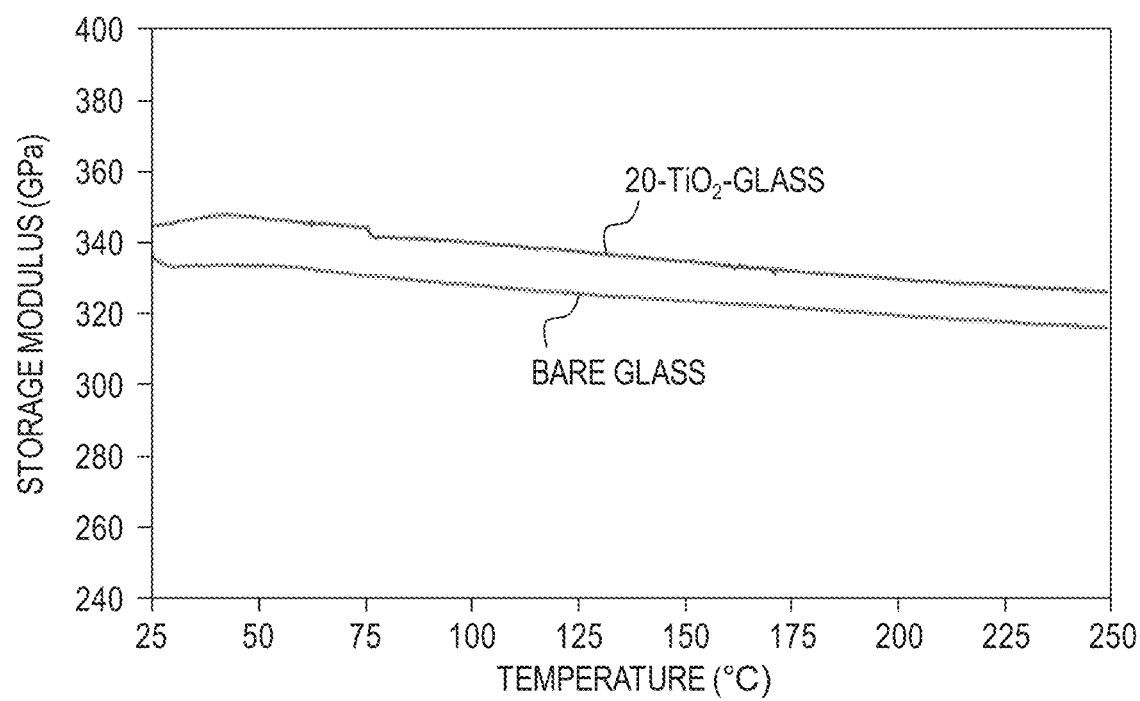
FIG. 10 shows storage moduli of bare annealed glass and 20-$TiO_2$-GLASS.

A dynamical mechanical analysis was performed in order to check if the glass mechanical properties were affected following the application of e-beam deposited 20 nm $TiO_2$ layer. FIG. 10 shows storage moduli of bare annealed glass and 20-$TiO_2$-GLASS, the functionalized glass. The storage modulus of the bare glass (~326 GPa), proportional to the energy stored during a loading cycle, was only slightly lower than the functionalized glass (~335 GPa) over the entire range of temperature (25-250° C.) as shown in FIG. 10. Thus, the mechanical properties of the glass are not affected by the functionalization with $TiO_2$, as desired.

Figure 11:
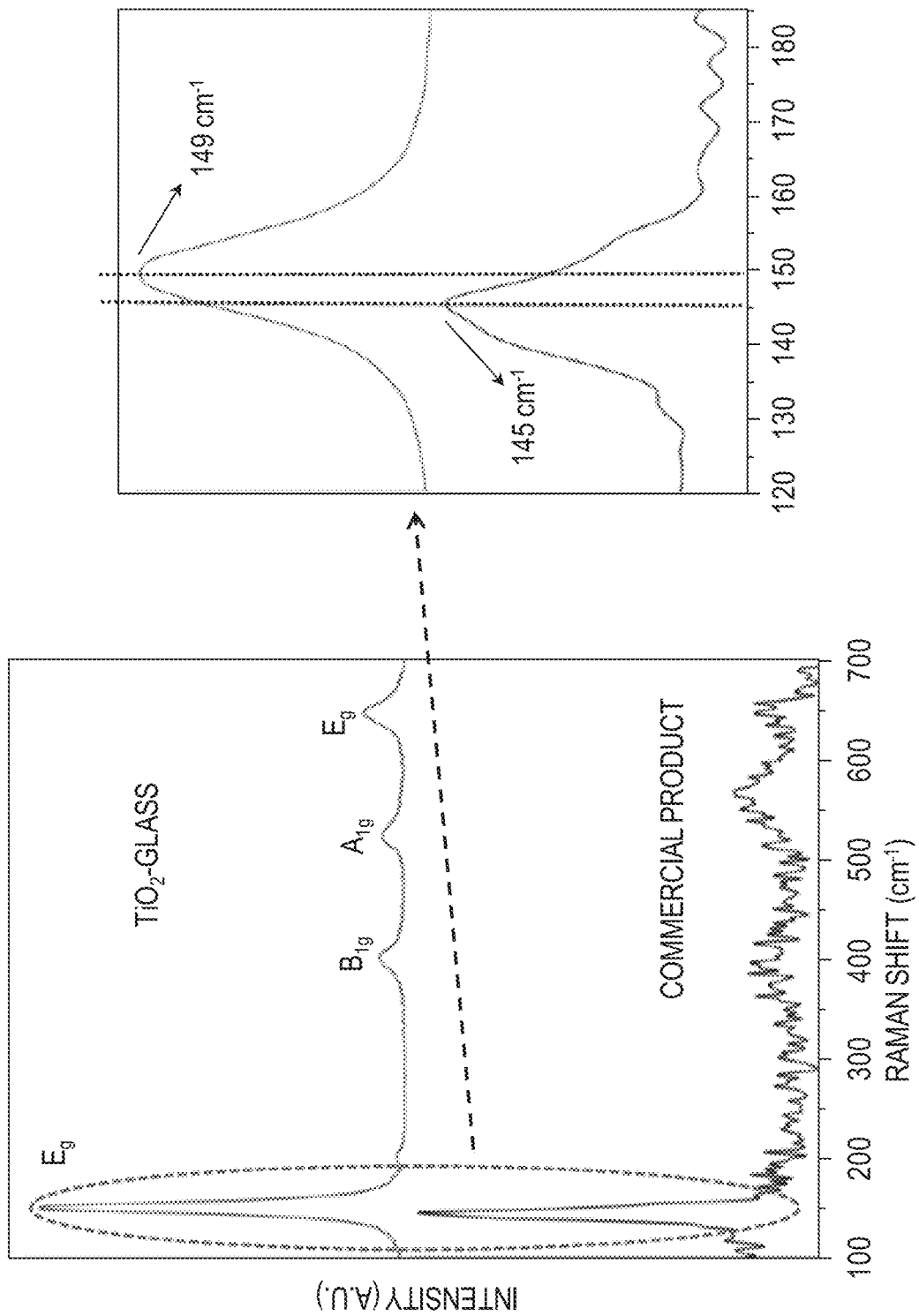
FIG. 11 illustrates Raman spectra of $TiO_2$-GLASS and the commercial product.

Raman spectroscopy was used to investigate the structural properties of the prepared samples, the annealed $TiO_2$-GLASS and the commercial product. FIG. 11 illustrates Raman spectra of $TiO_2$-GLASS and the commercial product. Raman spectra of the annealed $TiO_2$-GLASS and the commercial product confirmed the occurrence of anatase, whose characteristic bands were present in both films. $E_g$ peaks are due to symmetric stretching vibrations of O—Ti—O. $B_{1g}$ is due to symmetric bending vibration of O—Ti—O, whereas the $A_{1g}$ is produced by antisymmetric bending vibration of O—Ti—O. A significant shift of 4 $cm^{-1}$ was found for the principal signal, detected at 145 $cm^{-1}$ in the commercial product and at 149 $cm^{-1}$ in the $TiO_2$-GLASS sample (FIG. 11). This positive shift may be ascribed to the presence of more oxygen vacancies in the $TiO_2$-GLASS sample, which may induce the reduction of titanium oxidation state from 4+ to 3+ as a consequence of the deposition technique and the following annealing treatment. The $Ti^{3+}$ and oxygen vacancies may support the adsorption of water molecules at defect sites and further promote hydrophilicity.

EXAMPLE 4

Antifogging Properties of Non-Porous $TiO_2$ Films

Figure 12A:
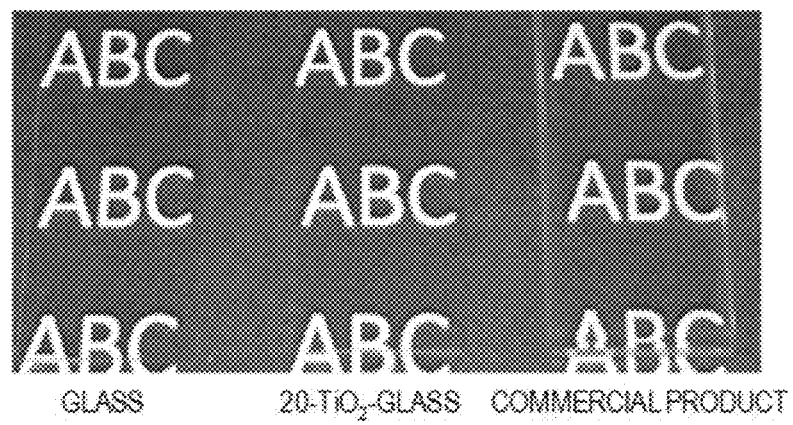
FIGS. 12A, 12B, and 12C depict antifogging and optical properties of bare glass, 20-$TiO_2$-GLASS and the commercial product.
Figure 12B:
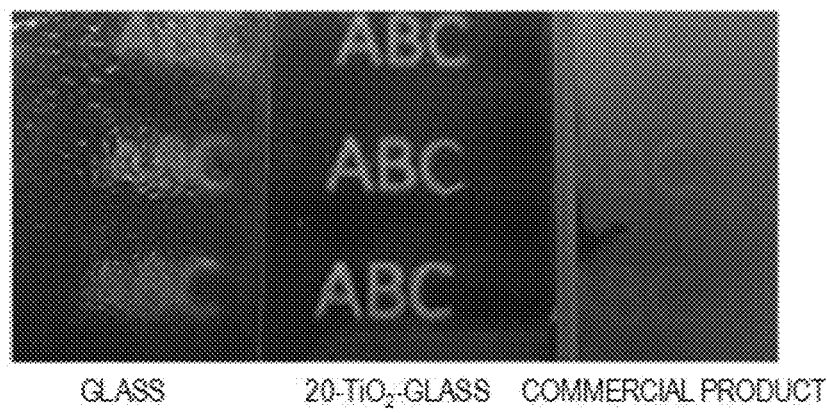
Figure 12C:
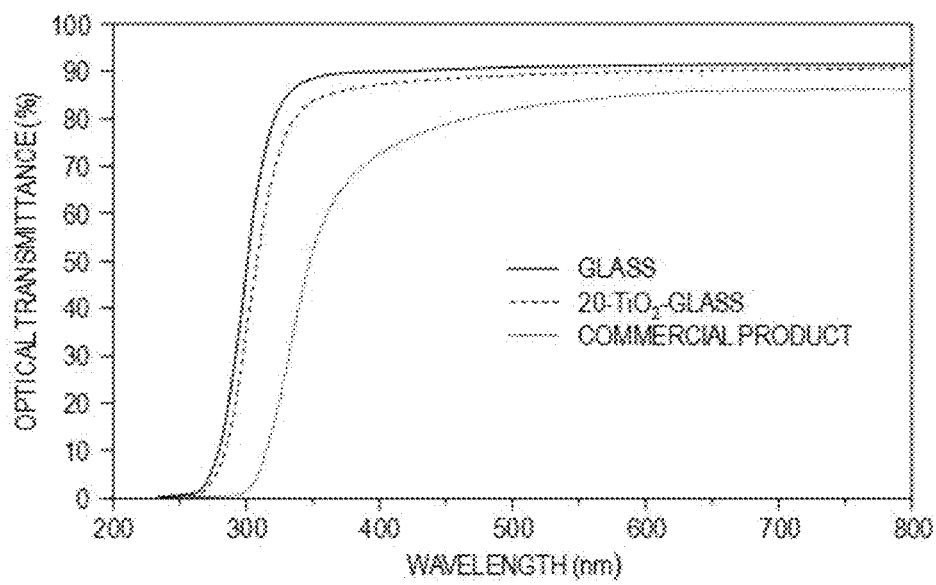

FIGS. 12A, 12B, and 12C depict antifogging and optical properties of bare glass, 20-$TiO_2$-GLASS and the commercial product. FIG. 12A shows three samples that appeared transparent before the anti-fogging test. FIG. 12B shows anti-fogging characters of bare glass, 20-$TiO_2$-GLASS after two months from the thermal treatment and the commercial product. The thermal treatment is discussed in Example 1. FIG. 12C depicts a comparison graph showing UV-vis transmittance data of the commercial product and the glass before and after the application of a 20 nm-thick layer of $TiO_2$, which slightly changed the transmittance of the substrate, leading to a minor shift of the absorption edge.

The antifogging properties, essential when glass is used in indoor and outdoor humid environments, were tested by placing the samples in a deep-freeze at −15° C. Before the test, all the samples appeared completely transparent, with no outward signs of the 20 nm layer deposited on the glass as shown in FIG. 12A. After 2 hours in the deep-freeze, the samples were exposed to the humid indoor air, and the 20-$TiO_2$-GLASS sample resulted by far the one with the best antifogging behavior thanks to its superhydrophilic character. The lower wettability of the commercial product and bare glass caused the moisture to condense on their surface, resulting in a relatively fogged-up appearance in the commercial product and occurrence of small droplets in the bare glass. The prepared superhydrophilic films 20-$TiO_2$-GLASS sample) showed an excellent water spreading, leading to the formation of a uniform water film. The anti-fogging character of the 20-$TiO_2$-GLASS was unchanged over time, as confirmed by the tests performed after two months from the thermal treatment as shown in FIG. 12B.

Optical transparency was investigated in the range 200 nm-800 nm. As shown in FIG. 12C, the deposition of a 20 nm $TiO_2$ film on the glass did not affect the transmittance spectrum significantly over the entire range of wavelength considered. Indeed, only a minor shift of the absorption edge was noticed with respect to glass, unlike the commercial product sample, which started to absorb markedly below 400 nm. With regard to the commercial product sample, such difference in the absorption edge may also result from the thickness of the commercial product sample, being much greater than the glass substrate used for 20-$TiO_2$-GLASS. Notably, the refractive index (RI) of the common glass (RI≈1.46) is not affected by the application of a 20 nm thick layer of TiO, since the optical transmittance of such thin $TiO_2$ layer is almost identical to that of the bare glass.

Figure 13A:
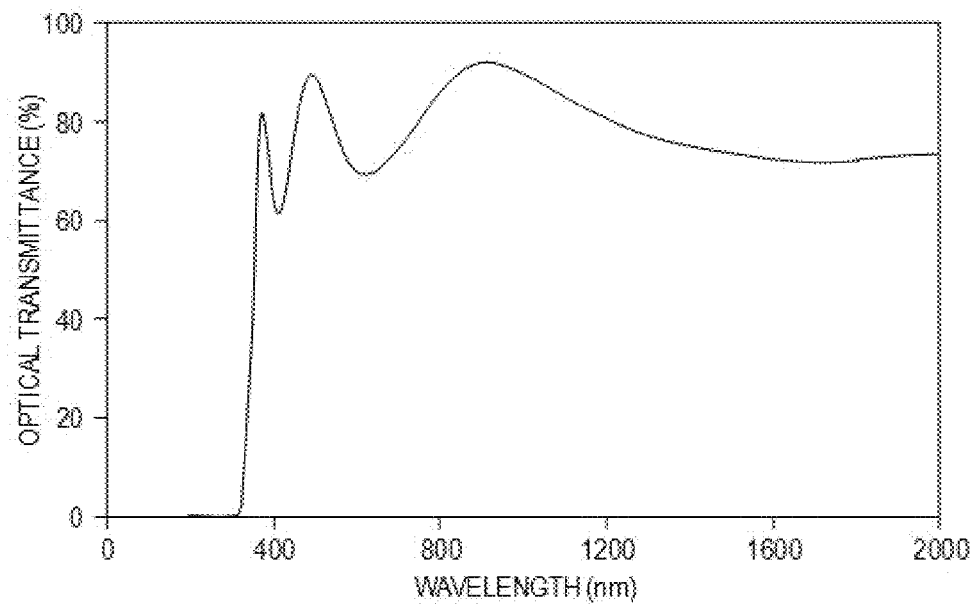
FIG. 13A shows UV-vis transmittance spectra.
Figure 13B:
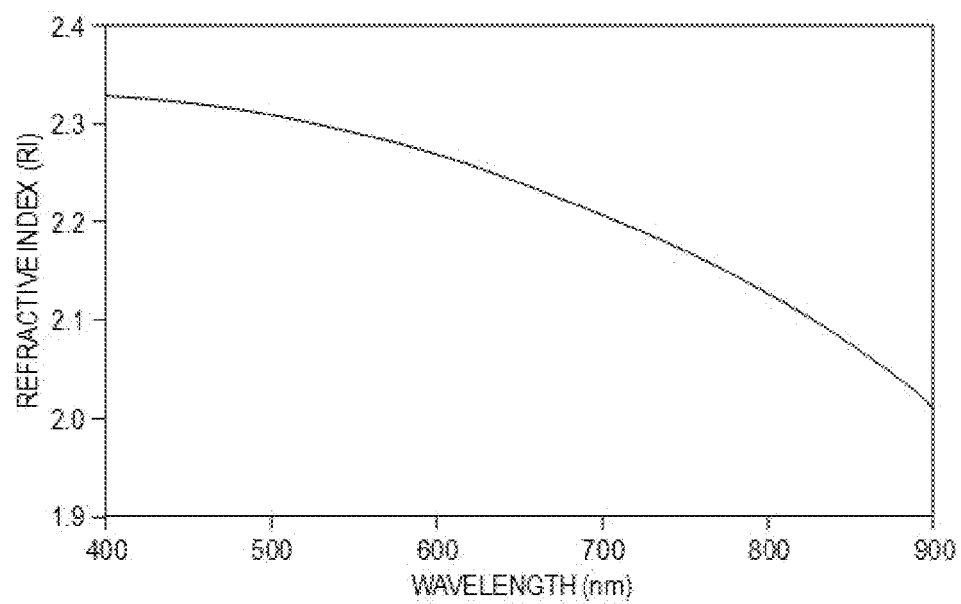
FIG. 13B shows refractive index of a 250 nm $TiO_2$ film deposited on glass.

The RI was computed using the Swanepoel method, from the transmission spectrum, which envelopes around the maxima and minimum were constructed using parabolic interpolation. FIG. 13A shows UV-vis transmittance spectra of a 250 nm $TiO_2$ film deposited on glass, and FIG. 13B shows refractive index of a 250 nm $TiO_2$ film deposited on glass. The RI versus the wavelength was obtained by the equations provided by Swanepoel method. The RI of 250 nm $TiO_2$ films, showing appreciable interference fringes in the transmittance spectrum as shown in FIG. 13A, was estimated by the Swanepoel method, which is applicable to thin films deposited on transparent substrates that are much thicker than thin films as conditions were met in this work. The obtained RI were in the range 2.31-2.01 between 400 and 900 nm as shown in FIG. 13B. These values are consistent with the ones reported for thin films deposited by similar techniques.

EXAMPLE 5

Photocatalytic Properties of Non-Porous $TiO_2$ Films

Figure 14A:
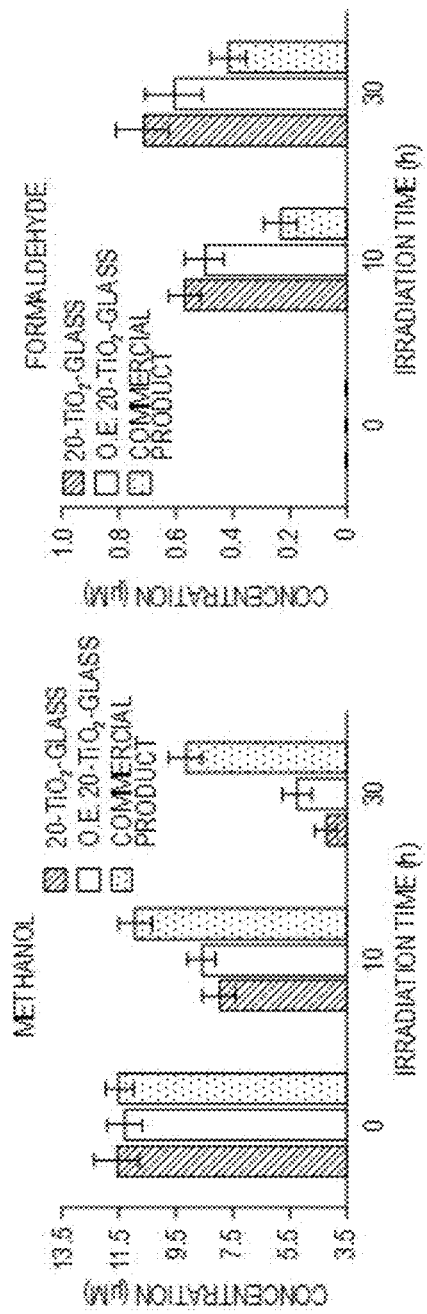
FIGS. 14A and 14B show reactivity results of 20-$TiO_2$-GLASS, outdoor-exposed 20-$TiO_2$-GLASS (O.E. 20-$TiO_2$-GLASS) and commercial product.
Figure 14B:
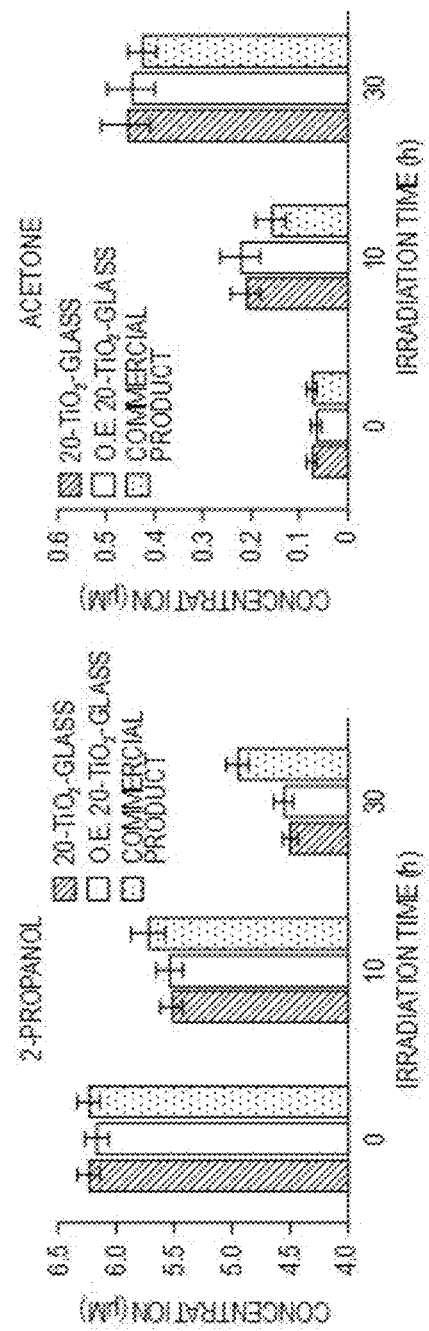

FIGS. 14A and 14B show reactivity results of 20-$TiO_2$-GLASS, outdoor-exposed 20-$TiO_2$-GLASS (O.E. 20-$TiO_2$-GLASS) and commercial product. Tests were performed in gas-phase under UV light using methanol and 2-propanol as target molecules. FIG. 14A shows the concentrations of methanol and formaldehyde monitored over the time, and FIG. 14B shows the concentrations of 2-propanol and acetone monitored over the time. It illustrates that the $TiO_2$ film exhibits a higher photocatalytic activity compared to the commercial product.

The photocatalytic activity for the degradation of two target organic molecules, methanol and 2-propanol, was proved in gas phase in oxygen atmosphere. Both target molecules, methanol and 2-propanol, were successfully degraded, and their main organic intermediate (formaldehyde and acetone, respectively) were detected. As illustrated in FIGS. 14A and 14B, 20-$TiO_2$-GLASS shows a better performance compared to the commercial product, resulting in higher conversions and reaction rates. The presence of an elevated density of $Ti^{3+}$ defects in the prepared films, as confirmed by the Raman analysis (See FIG. 11), may be responsible for the higher photocatalytic activity. Indeed, $Ti^+$ states can enhance charge separation and improve light absorption. Finally, all the reactivity tests were carried out after outdoor exposure of the samples, which is discussed in Example 3, and, remarkably, the photocatalytic activity remained broadly unchanged, as depicted in FIGS. 14A and 14B.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. A coated glass comprising
a glass substrate; and
a $TiO_2$ film on the glass substrate,
wherein the TiO2 film is non-porous, and
wherein the $TiO_2$ film maintains a water contact angle less than 5° in the dark for five days after an annealing treatment.

2. The coated glass of claim 1, wherein the $TiO_2$ film has a thickness of from about 20 nm to about 250 nm.

3. The coated glass of claim 1, wherein the $TiO_2$ film has a thickness of about 20 nm.

4. The coated glass of claim 1, wherein the water contact angle: of the $TiO_2$ film stabilizes at less than 20° after ten days from the annealing treatment.

5. The coated glass of claim 1, wherein the water contact angle of the $TiO_2$ film is less than 5° for eight days from the annealing treatment and UV-exposure.

6. The coated glass of claim 1, wherein the water contact angle of the $TiO_2$ film stabilizes at less than 15° after fifteen days from the annealing treatment and UV-exposure.

7. The coated glass of claim 1, therein the $TiO_2$ film has a grain size of from about 30 nm to about 50 nm.

8. The coated glass of claim 1, wherein the $TiO_2$ film has a root mean square (RMS) roughness of about 13 nm.

9. The coated glass of claim 1, wherein the coated glass has optical transmittance greater than 85% at wavelength higher than 350 nm.

10. The coated glass of claim 1, wherein the coated glass shows higher water spreading characteristic than the glass substrate after exposure to humid indoor air following 2 hours in a freezer at −15° C.

11. The coated glass of claim 1, wherein a difference between storage modulus of the coated glass and storage modulus of the glass substrate is less than 20 Gpa.

12. The coated glass of claim 1, wherein the coated glass reduces a molar concentration of methanol by about 60% when the coated glass is tested in gas phase in oxygen atmosphere and is exposed to UV light for about 30 hours.

13. The coated glass of claim 1, wherein the coated glass reduces a molar concentration of 2-propanol by about 20% when the coated glass is tested in gas phase in oxygen atmosphere and is exposed to UV light for about 30 hours.

14. The coated glass of claim 1, wherein the $TiO_2$ film is impervious to water.

15. A coated glass comprising:
a glass substrate; and
wherein the TiO2 firm is non-porous, and
a $TiO_2$ film on the glass substrate,
wherein the $TiO_2$ film has a grain size of from about 30 nm to about 50 nm.

16. The coated glass of claim 15, wherein a root mean square (RMS) roughness of the $TiO_2$ film is about 13 nm.

17. The coated glass of claim 15, wherein the $TiO_2$ film maintains a water contact angle less than 5° in the dark for five days after an annealing treatment.

18. The coated glass of claim 17, wherein the water contact angle of the $TiO_2$ film stabilizes at less than 20° after ten days from the annealing treatment.

19. The coated glass of claim 15, wherein a water contact angle of the $TiO_2$ film is less than 5° for eight days from an annealing treatment and UV-exposure.

20. The coated glass of claim 19, wherein the water contact angle of the $TiO_2$ film stabilizes at less than 15° after fifteen days from the annealing treatment and UV-exposure.

21. The coated glass of Claim 15, wherein the $TiO_2$ film has a thickness of from about 20 nm to about 250 nm.

22. The coated glass of claim 15, wherein the $TiO_2$ film has a thickness of about 20 nm.

23. The coated glass of claim 15, wherein the coated glass has optical transmittance greater than 85% at wavelength higher than 350 nm.

24. The coated glass of claim 15, wherein a difference between storage modulus of the coated glass and storage modulus of the glass substrate is less than 20 Gpa.

25. The coated glass of claim 15, wherein the $TiO_2$ film is impervious to water.

* * * * *